US008452133B2

(12) United States Patent
Oba

(10) Patent No.: US 8,452,133 B2
(45) Date of Patent: May 28, 2013

(54) UNDERLINE REMOVAL APPARATUS

(75) Inventor: Mitsuharu Oba, Tokyo (JP)

(73) Assignee: Hitachi Solutions, Ltd., Tokyo (JP)

( * ) Notice: Subject to any disclaimer, the term of this patent is extended or adjusted under 35 U.S.C. 154(b) by 498 days.

(21) Appl. No.: 12/659,293

(22) Filed: Mar. 3, 2010

(65) Prior Publication Data
US 2010/0259558 A1    Oct. 14, 2010

(30) Foreign Application Priority Data

Apr. 13, 2009   (JP) ................................. 2009-096965

(51) Int. Cl.
*G06K 9/03* (2006.01)
(52) U.S. Cl.
USPC ........... 382/310; 382/112; 382/242; 382/202; 345/626; 345/636; 345/441; 715/233; 715/269
(58) Field of Classification Search
USPC .................. 382/310, 175, 173, 229
See application file for complete search history.

(56) References Cited

U.S. PATENT DOCUMENTS

| | | | | |
|---|---|---|---|---|
| 4,292,622 A | * | 9/1981 | Henrichon, Jr. ............. | 382/177 |
| 4,466,121 A | * | 8/1984 | Damen et al. ................. | 382/174 |
| 4,633,502 A | * | 12/1986 | Namba ........................ | 382/177 |
| 4,887,301 A | * | 12/1989 | Hodgens et al. ............. | 382/178 |
| 5,033,104 A | * | 7/1991 | Amano ........................ | 382/177 |
| 5,062,141 A | * | 10/1991 | Nakayama et al. ........... | 382/174 |
| 5,391,889 A | * | 2/1995 | Nishijima et al. ............ | 250/555 |
| 5,590,257 A | * | 12/1996 | Forcier ........................ | 715/273 |

(Continued)

FOREIGN PATENT DOCUMENTS

| | | |
|---|---|---|
| EP | 1 257 115 A2 | 11/2002 |
| EP | 1 257 115 A3 | 2/2005 |

(Continued)

OTHER PUBLICATIONS

Zhiguo Cheng, Yuncai Liu, "A graph-based method to remove interferential curve from text image", Machine Vision and Applications 2006.*

(Continued)

*Primary Examiner* — Chan S Park
*Assistant Examiner* — Mark Roz
(74) *Attorney, Agent, or Firm* — Stites & Harbison PLLC; Juan Carlos A. Marquez, Esq.; Stephen J. Weyer, Esq.

(57) ABSTRACT

To remove an underline even if a business document includes a chart or even if the underline touches a character string, provided is an underline removal apparatus that removes an underline area from binary image data including the underline area touching a character string, the underline removal apparatus including: an underline search processing unit that executes a line template matching process by setting a point on the binary image data as a starting point to set a rectangular line template, tracing pixels included in the line template, and extracting a polyline indicating underline position coordinates; and an underline removal processing unit that uses the polyline to execute a process of obtaining background borderline coordinates between the underline area and a background area and character borderline coordinates between the underline area and the character string obtained by applying an interpolation process to a part in the underline area touching the character string and to execute a process of replacing an area surrounded by the background borderline coordinates and the character borderline coordinates by a color of pixels of the background area.

6 Claims, 17 Drawing Sheets

U.S. PATENT DOCUMENTS

| | | | |
|---|---|---|---|
| 5,619,592 A * | 4/1997 | Bloomberg et al. | 382/175 |
| 5,619,594 A * | 4/1997 | Melen | 382/233 |
| 5,859,929 A * | 1/1999 | Zhou et al. | 382/175 |
| 6,035,061 A * | 3/2000 | Katsuyama et al. | 382/177 |
| 6,823,081 B2 | 11/2004 | Lee et al. | |
| 2002/0168102 A1 | 11/2002 | Lee et al. | |
| 2004/0252888 A1* | 12/2004 | Bargeron et al. | 382/188 |

FOREIGN PATENT DOCUMENTS

| | | |
|---|---|---|
| JP | 61-015284 | 1/1986 |
| JP | 09-185726 | 7/1997 |
| JP | 10-334185 | 12/1998 |
| JP | 2002-358482 | 12/2002 |

OTHER PUBLICATIONS

Office action from Chinese Patent Office dated Feb. 13, 2012, for Chinese application 201010136232.1, which is the corresponding Chinese patent application of the present US patent application.

Mitsuharu Oba et al., "Underline Removal Method by Utilizing Characteristics of Japanese Business Documents," IEEE TENCON 2009, pp. 1-6, Jan. 26, 2009.

Office Action from Japanese Patent Office in corresponding Japanese Patent Application No. 2009-096965, dated Feb. 19, 2013, pp. 1-2 in Japanese, pp. 1-2 in its English translation.

Shima et al., "An Extraction Method of Underlines in Form Images," FIT Information Science and Technology Forum (The Institute of Electronics, Information and Communication Engineers and Information Processing Society of Japan) Steering Committee, Sep. 13, 2002, vol. 2002, No. 3, pp. 169-170 in Japanese, pp. 1-6 in its English translation.

* cited by examiner

FIG. 2

Letter of acceptance

ATTN: Japan Software Engineering Co., Ltd.

Your Company: Japan Manufacturing Co., Ltd.

We have completed inspecting the following objects.

Note

Order number : 1112345678999    Our company WBS : 0123456789

Product name: Development of index creation function for built-in DB

| Item number | Delivered object name | Quantity | Remark |
|---|---|---|---|
| 1 | Function specifications | 1 | CD-R |
| 2 | Program (Source file) | 1 | CD-R |
| 3 | Program checklist | 1 | CD-R |
| 4 | Bug control chart | 1 | CD-R |
| 5 | Worker list | 1 | |
| 6 | Confirmation note (at the start and end) | 1 | |
| 7 | - Blank space hereinafter - | | |
| 8 | | | |
| 9 | | | |
| 10 | | | |
| 11 | | | |
| 12 | | | |

| Receipt stamp |  | Remark | |

FIG. 3

Letter of acceptance

ATTN: Japan Software Engineering Co., Ltd.

Your Company: Japan Manufacturing Co., Ltd.

We have completed inspecting the following objects.  ⟶ Character string with underline Note Order number : 1112345678999          Our company WBS : 0123456789

Product name: Development of index creation function for built-in DB

| Item number | Delivered object name | Quantity | Remark |
|---|---|---|---|
| 1 | Function specifications | 1 | CD-R |
| 2 | Program (Source file) | 1 | CD-R |
| 3 | Program checklist | 1 | CD-R |
| 4 | Bug control chart | 1 | CD-R |
| 5 | Worker list | 1 | |
| 6 | Confirmation note (at the start and end) | 1 | |
| 7 | - Blank space hereinafter - | | |
| 8 | | | |
| 9 | | | |
| 10 | | | |
| 11 | | | |
| 12 | | | |

| Receipt stamp | | Remark | |
|---|---|---|---|

FIG. 4

La+tec oE BGcb8+aoca

B++ot Jabao Sobthabc EochoaeOio9 Cb-- Lfd.

¥6uo Ccwbeoy; Jbbao Mobc8eb+ofing Gb-, Lte,

We have completed inspecting the following objects.

→ Error character string

Note

Obaob Mumboac III2B_56ZGz99        6ub Qowfaoy W8b; bI2H45GZ89

Bsoduof Ace8: DekoIobmeoI ob Iocex Zroafion Bunotioo

| Item number | Delivered object name | Quantity | Remark |
|---|---|---|---|
| 1 | Function specifications | 1 | CD-R |
| 2 | Program (Source file) | 1 | CD-R |
| 3 | Program checklist | 1 | CD-R |
| 4 | Bug control chart | 1 | CD-R |
| 5 | Worker list | 1 | |
| 6 | Confirmation note (at the start and end) | 1 | |
| 7 | - Blank space hereinafter - | | |
| 8 | | | |
| 9 | | | |
| 10 | | | |
| 11 | | | |
| 12 | | | |

| Receipt stamp | | Remark | |
|---|---|---|---|

FIG. 5

Letter of acceptance

ATTN: Japan Software Engineering Co., Ltd.

Your Company: Japan Manufacturing Co., Ltd.

We have completed inspecting the following objects.

Note

Order number : 1112345678999　　　　　　　　Our company WBS : 0123456789

Product name: Development of index creation function for built-in DB

| Item number | Delivered object name | Quantity | Remark |
|---|---|---|---|
| 1 | Function specifications | 1 | CD-R |
| 2 | Program (Source file) | 1 | CD-R |
| 3 | Program checklist | 1 | CD-R |
| 4 | Bug control chart | 1 | CD-R |
| 5 | Worker list | 1 | |
| 6 | Confirmation note (at the start and end) | 1 | |
| 7 | - Blank space hereinafter - | | |
| 8 | | | |
| 9 | | | |
| 10 | | | |
| 11 | | | |
| 12 | | | |

| Receipt stamp | | Remark | |
|---|---|---|---|
| | | | |

FIG. 10A

Search target area

Letter of acceptance

ATTN: Japan Software Engineering Co., Ltd.

Your Company: Japan Manufacturing Co., Ltd.

We have completed inspecting the following objects.

Note

Order number : 1112345678999          Our company WBS : 0123456789

Product name: Development of index creation function for built-in DB

| Item number | Delivered object name | Quantity | Remark |
|---|---|---|---|
| 1 | Function specifications | 1 | CD-R |
| 2 | Program (Source file) | 1 | CD-R |
| 3 | Program checklist | 1 | CD-R |
| 4 | Bug control chart | 1 | CD-R |
| 5 | Worker list | 1 | |
| 6 | Confirmation note (at the start and end) | 1 | |
| 7 | - Blank space hereinafter - | | |
| 8 | | | |
| 9 | | | |
| 10 | | | |
| 11 | | | |
| 12 | | | |

| Receipt stamp | 鈴 09.01.27 木 | Remark | |
|---|---|---|---|

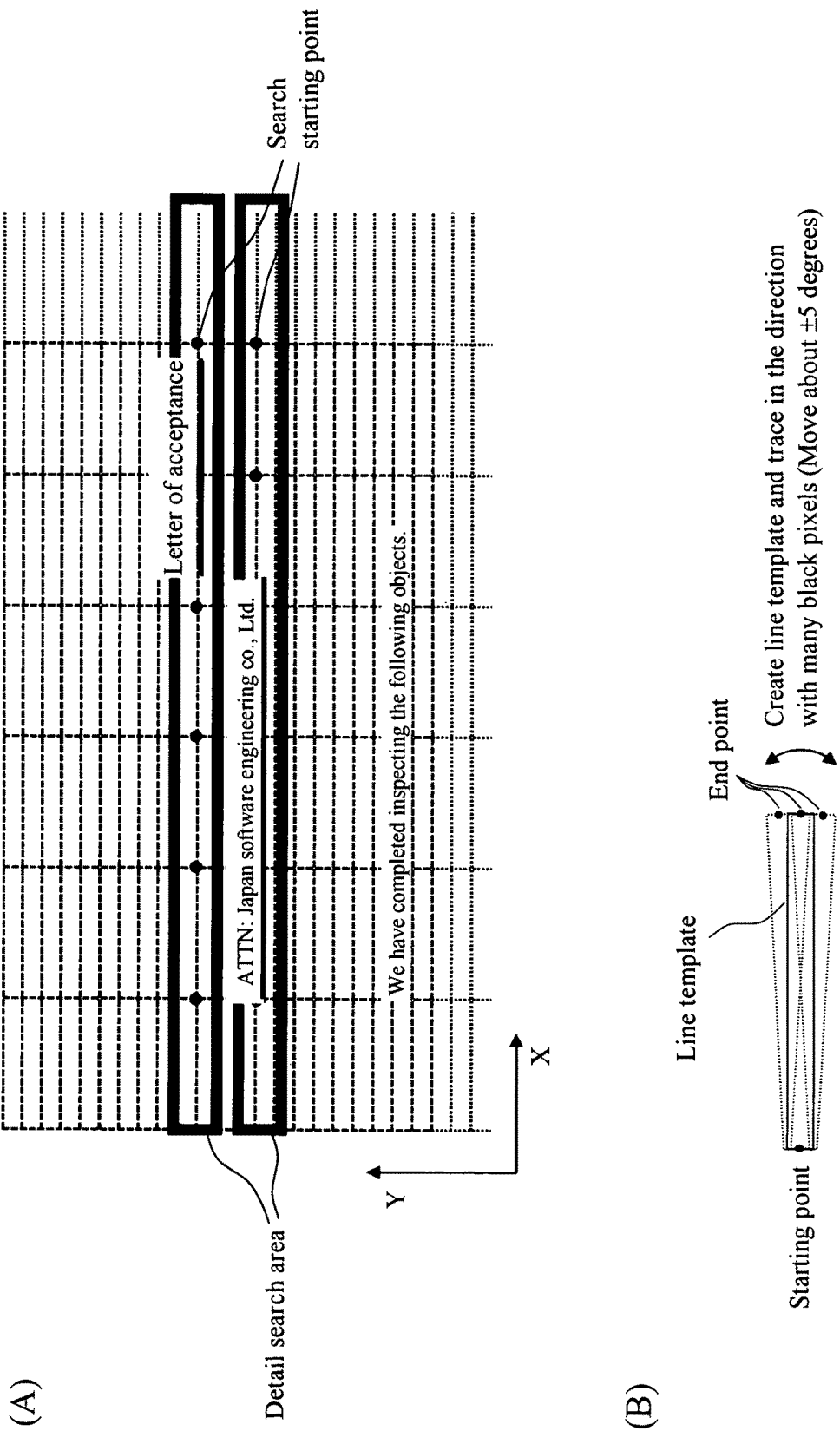

Check validity of tracing result
(1) Isn't it part of character? (Check length)
(2) Isn't it chart? (Check both ends)

FIG. 14
(A)
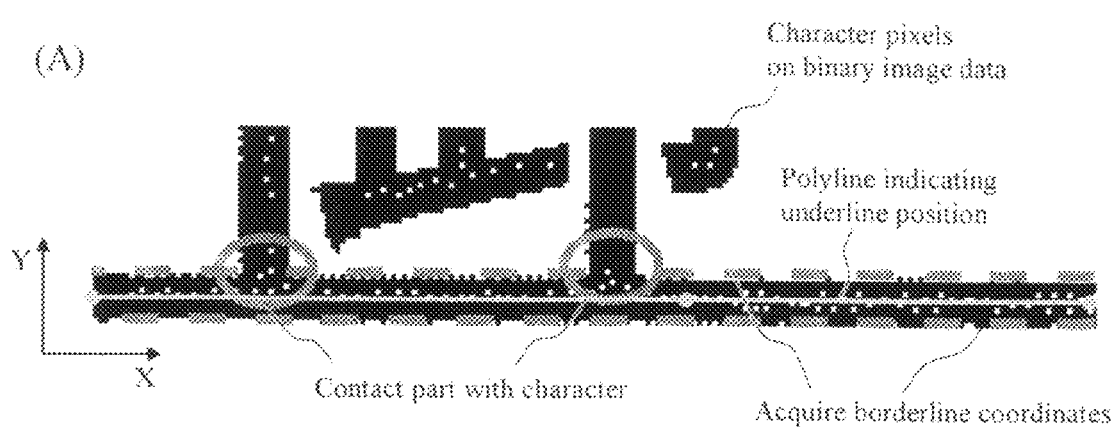
(B)
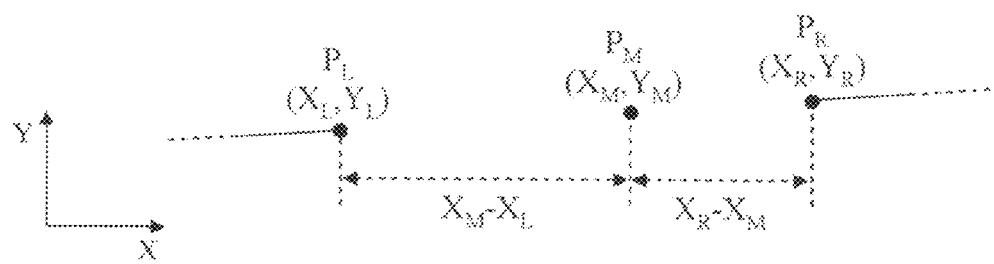
(C)
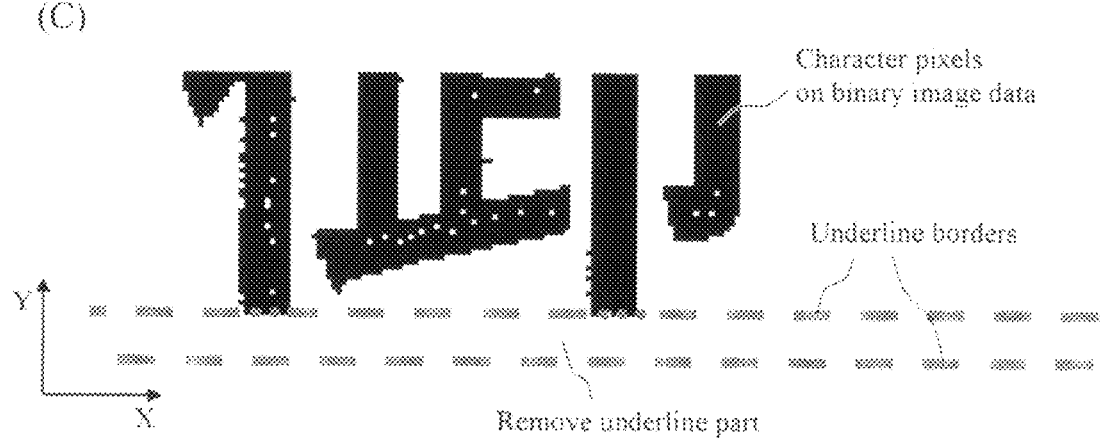

UNDERLINE REMOVAL APPARATUS

BACKGROUND OF THE INVENTION

1. Field of the Invention

The present invention relates to a business document processing apparatus, and for example, to a technique for removing an underline touching a character string in a business document.

2. Background Art

In recent years, there is a move to apply character recognition by scanning and OCR to business documents with an enormous amount of paper stored in an organization and manage document data in a document management system to attain improved search performance, secure storage of paper documents, and sharing of knowledge.

Although the recognition accuracy of character strings of a document without noise is high in the current OCR, there is a problem that when an underline is drawn touching a character string, characters of that part cannot be correctly recognized in many cases. In OCR, characters are cut out one by one to recognize the characters, and a process of determining what characters are the cut out characters is executed. However, when an underline is attached to characters, cutting out of the characters often fails or a wrong determination is made by recognizing the underline as part of the characters. The wrong recognition causes a failure in acquiring the character information of that part and becomes an obstacle in searching because meaningless character information remains as noise. Character strings with underlines among the character strings in a business document are often essential information for identifying the document, such as the title of the document, business partner name, and various management numbers. Therefore, the document cannot be narrowed down in the search if the information cannot be correctly recognized. In that case, a burdensome process of checking all registered document data is necessary. Therefore, when OCR is applied, characters of character strings need to be recognized with high accuracy even if underlines touch the character strings.

A method of extracting and removing an underline from a character string with underline in a document is proposed as a section which improves the recognition accuracy of OCR when there is an underline on a character string. For example, Yoshihiro Shima and three others, "One Method of Underline Extraction from Business Form Image", FIT 2002 (Forum on Information Technology), I-85, pp. 169-170, 2002.09 proposes a technique for removing an underline on a character string existing on a business form image. Zhen-Long Bai, Qiang Huo, "Underline Detection and Removal in a Document Image Using Multiple Strategies", icpr, pp. 578-581, 17th International Conference on Pattern Recognition (ICPR '04)—Volume 2, 2004 proposes a technique in which an underline touching a character string is also removed.

However, the technique of Yoshihiro Shima and three others, "One Method of Underline Extraction from Business Form Image", FIT 2002 (Forum on Information Technology), I-85, pp. 169-170, 2002.09 is a technique designed to handle a case that the underline and the character string do not touch. Therefore, the underline cannot be removed when the character string and the underline touch. The technique of Zhen-Long Bai, Qiang Huo, "Underline Detection and Removal in a Document Image Using Multiple Strategies", icpr, pp. 578-581, 17th International Conference on Pattern Recognition (ICPR '04)—Volume 2, 2004 is designed to handle a case that the document includes only characters and underlines. Therefore, when the technique is applied to a document that often includes charts, such as a business document, there may be an adverse effect that ruled lines constituting the charts are removed.

The present invention has been made in view of the foregoing circumstances and provides a technique that can remove an underline even if a business document includes a chart or an underline touches a character string.

SUMMARY OF THE INVENTION

To solve the problems, an underline removal apparatus of the present invention executes roughly the following two processes.

In a first process, underline position coordinates of an underline area are extracted from binary image data. The underline position coordinates are obtained by extracting, for every predetermined length, coordinates included in an underline area with certain width and length. The underline position coordinates determine the framework of the underline area. Specifically, rectangular line templates having a certain area are set on the binary image data, and pixels satisfying a predetermined value in the line templates are traced to extract the underline position coordinate from each line template.

In a second process, borderline coordinates between an underline area and the background and between the underline area and a character string are obtained to remove the identified underline area. Specifically, pixels are searched in the perpendicular direction relative to the polyline along the polyline connecting the extracted underline position coordinates to obtain the borderline coordinates. More specifically, when pixels satisfying a predetermined number of pixels do not exist in a predetermined range, it is determined as a borderline between the underline area and the background, and the borderline coordinates are obtained. On the other hand, when pixels satisfying the predetermined number of pixels exist beyond a predetermined range, it is determined that the character string touches the underline area, and the borderline coordinates are interpolated. An underline area specified by the obtained borderline coordinates is removed from the binary image data. Specifically, the underline area surrounded by the obtained borderline coordinates is replaced by background pixels.

More specifically, the present invention provides an underline removal apparatus that removes an underline area from binary image data including the underline area touching a character string, the underline removal apparatus comprising: an underline search processing unit that executes a line template matching process by setting a point on the binary image data as a starting point to set a rectangular line template, tracing pixels included in the line template, and extracting a polyline indicating underline position coordinates; and an underline removal processing unit that uses the polyline to execute a process of obtaining background borderline coordinates between the underline area and a background area and character borderline coordinates between the underline area and the character string obtained by applying an interpolation process to a part in the underline area touching the character string and to execute a process of replacing an area surrounded by the background borderline coordinates and the character borderline coordinates by a color of pixels of the background area.

Further features of the present invention will become apparent by the preferred embodiments for carrying out the present invention and the accompanying drawings.

According to the present invention, an underline can be removed from binary image data including an underline area touching a character string. As a result, the accuracy of OCR to the characters in a document improves, and the search performance of a business document improves.

BRIEF DESCRIPTION OF THE DRAWINGS

FIG. 2 is a diagram showing an example of scanned image data stored in a storage device shown in FIG. 1.

FIG. 3 is a diagram showing an example of binary image data stored in a data memory shown in FIG. 1.

FIG. 4 is a diagram showing an example of a result of applying OCR to the binary image data shown in FIG. 3.

FIG. 5 is a diagram showing an example of a result of applying the present invention to the binary image data shown in FIG. 3.

FIG. 10A is an explanatory diagram of an underline estimation process in the underline search processing unit.

FIG. 11 is an explanatory diagram of a line template matching process in the underline search processing unit.

FIG. 14 is an explanatory diagram of a process in the underline removal processing unit.

DESCRIPTION OF SYMBOLS

Figure 1:
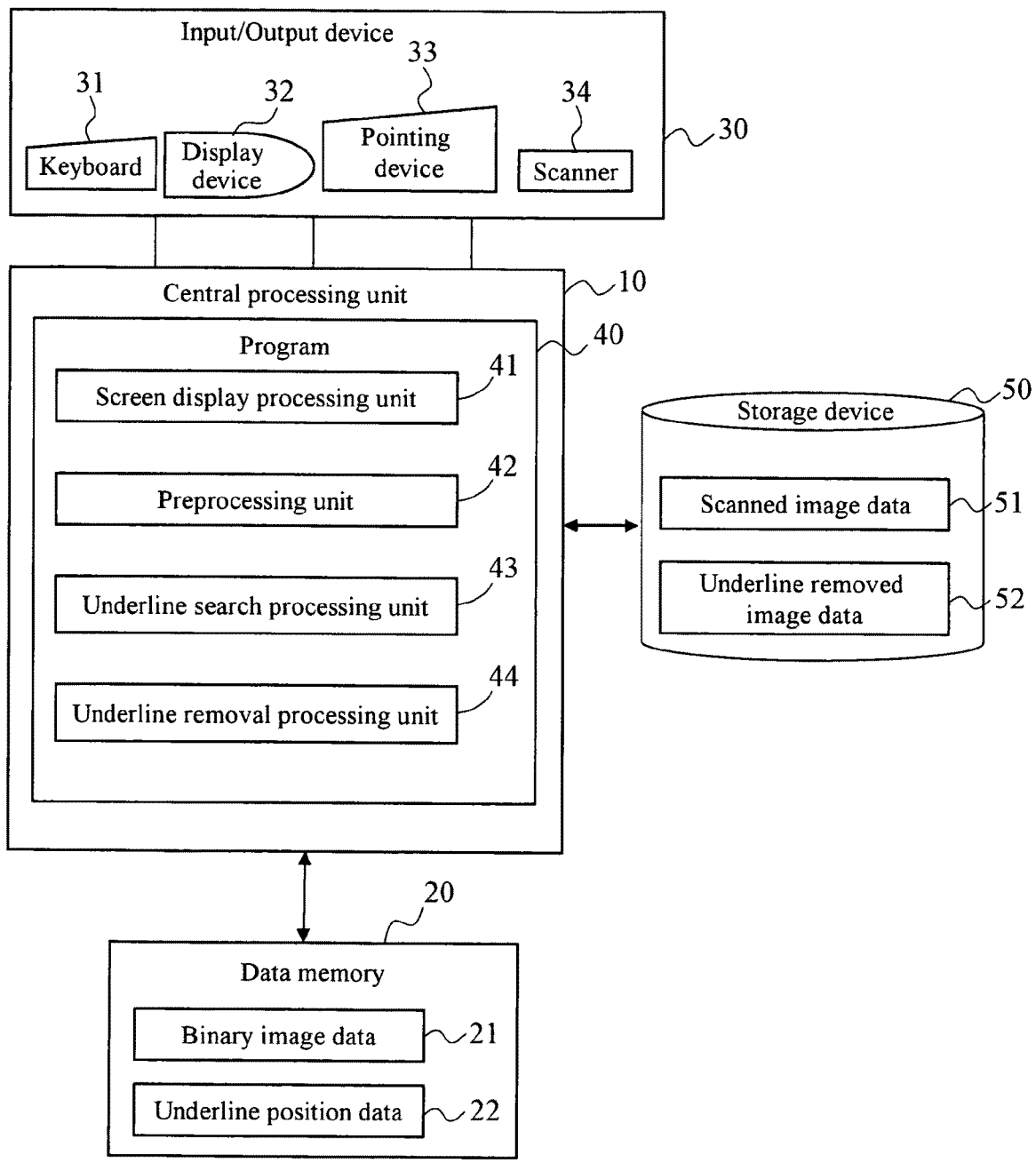
FIG. 1 is a functional block diagram schematically showing a configuration of a business document processing apparatus according to an embodiment of the present invention.

10 . . . central processing unit
20 . . . data memory
21 . . . binary image data
22 . . . underline position data
30 . . . input/output device
31 . . . keyboard
32 . . . display device
33 . . . pointing device
34 . . . scanner
40 . . . underline removal process program
41 . . . screen display processing unit
42 . . . preprocessing unit
43 . . . underline search processing unit
44 . . . underline removal processing unit
50 . . . storage device
51 . . . scanned image data
52 . . . underline removed image data

DETAILED DESCRIPTION OF THE PREFERRED EMBODIMENTS

A preferred embodiment for carrying out an underline removal apparatus of the present invention will now be described in detail with reference to the accompanying drawings. FIGS. 1 to 15 are diagrams illustrating the embodiment of the present invention. In the drawings, the parts designated with the same reference numerals denote the same components, and fundamental configurations and operations are the same. It should be noted that the present embodiment is just an example for realizing the present invention and does not limit the technical scope of the present invention.

<Configuration of Underline Removal Apparatus>

FIG. 1 is a functional block diagram showing a schematic configuration of the underline removal apparatus according to the embodiment of the present invention. The underline removal apparatus comprises a central processing unit 10 that executes necessary arithmetic process, control process, etc., a data memory 20 that stores data necessary for the processes in the central processing unit 10, an input/output device 30 for inputting and outputting data, a program memory 40 that stores programs necessary for the processes in the central processing unit 10, and a storage device 50 that stores data to be processed or data after processing.

The data memory 20 comprises binary image data 21 obtained from scanned image data by binarization and underline position data 22 storing an underline position obtained by searching for an underline from binary image data.

The input/output device 30 comprises: an output unit constituted by a display device 32 that displays data, a printer (not shown), etc.; and an input unit constituted by a keyboard 31 for performing operations such as selecting a menu for displayed data, a pointing device 33 such as a mouse, a scanner 34 for importing a document, etc.

The program memory 40 comprises a screen display processing unit 41 as an interface for receiving a screen display or an input operation of the user, a preprocessing unit 42 that applies preprocessing (such as conversion from color to black and white and noise removal) to a scanned image, an underline search processing unit 43 that searches for an underline in a document to acquire a position of an underline, and an underline removal processing unit 44 that removes an extracted underline. The processing units are stored in the program memory 40 as program codes, and the central processing unit 10 executes the program codes to realize the processing units.

The storage device 50 comprises scanned image data 51 as a scanned image of a business document imported from a scanner, etc., and underline removed image data 52 which is an image from which an underline on a character string is removed by applying various processes based on the scanned image.

FIG. 2 is a diagram showing an example of the scanned image data 51 included in the storage device 50. The document includes underlines touching characters, a chart describing item names, quantities, etc., a receipt stamp in the chart, etc.

FIG. 3 is a diagram showing an example of the binary image data 21 included in the data memory 20. The binary image data 21 is image data obtained after removal of seal and binarization of luminance in the scanned image data 51. Areas surrounded by dotted lines on the upper part of the image include character strings with underlines.

FIG. 4 is an image indicating a result of direct application of OCR and character recognition to the binary image data 21 of FIG. 3. Character strings without underlines at the upper part of the image in the binary image data 21 of FIG. 3, the ruled lines at the lower part of the image, and inside the chart are appropriately recognized. On the other hand, the character strings with underlines in the areas surrounded by the dotted lines of FIG. 3 are wrongly recognized.

FIG. 5 is a diagram showing an example of the underline removed image data 52 from which the underlines touching the character strings are removed as a result of the application of the underline removal apparatus of the present invention to the binary image data 21 of FIG. 3. The storage device 50 stores the image data.

<Process in Underline Removal Apparatus>

A process executed by the underline removal apparatus configured as described above will be described. The central processing unit 10 causes the screen display processing unit 41 to display the scanned image data 51 inputted by the scanner 34. When a process execution command is received, the preprocessing unit 42, the underline search processing unit 43, the underline removal processing unit 44 are sequentially executed. The preprocessing unit 42 removes noise such as a seal on the image and executes a conversion process to a binary image. The generated binary image is stored in the data memory 20 as the binary image data 21. The underline search processing unit 43 searches underlines provided to character strings from the binary image data 21 and stores coordinate data of the underlines in the data memory 20 as the underline position data 22. The underline removal processing unit 44 removes the underlines from the binary image data 21 based on the underline position data 22. The image data after the removal of the underlines is stored in the storage device 50 as the underline removed image data 52. The processes will be described in detail below.

<Preprocessing>

Figure 6:
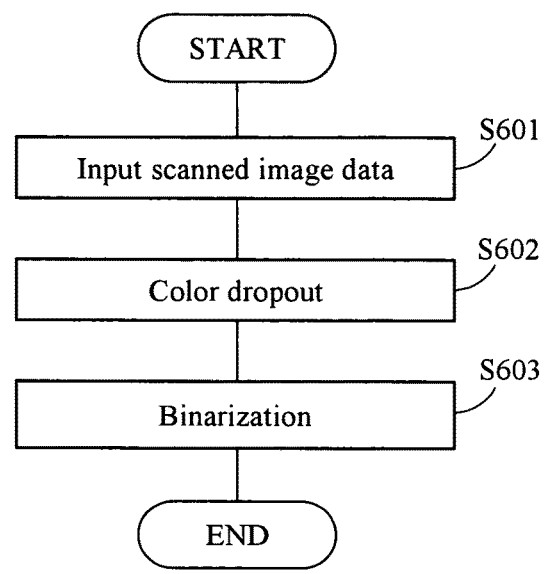
FIG. 6 is a flow chart for explaining a preprocessing unit in an underline removal program.

FIG. 6 is a flow chart showing a summary of the preprocessing. In the preprocessing, a binarization process is applied to a scanned image as shown in FIG. 2 as preprocessing of the underline search process. The entity of operation is the preprocessing unit 42.

In step S601, scanned image data obtained by scanning a business document is read out.

In step S602, a color dropout process is executed to remove seals such as a company seal and a business seal in the document. The color dropout process is a technique of utilizing the features of color information to remove specific objects, such as written characters, seals, and marks, from an image read out by a scanner, etc., from a document such as a business form (see, for example, JP Patent Publication (Kokai) No. 2002-358482A). The technique can remove objects, which become noise during reading of OCR, from the document.

In step S603, a binarization process is executed, and the image after the color dropout is converted to black and white binary data. Various known techniques can be applied to determine a binary threshold. An example of a discrimination analysis method includes a method of dividing the histogram of luminance of the entire image into two classes at a value ft and determining ft, where the calculation result of between-class distribution/(class 1 distribution+class 2 distribution) is the largest, as the threshold. In a general business document, black characters are written on a white background. Therefore, the threshold for the binarization can be easily determined. Image data generated after the binarization process is stored in the data memory 20 as the binary image data 21.

<Underline Search Process>

Figure 7:
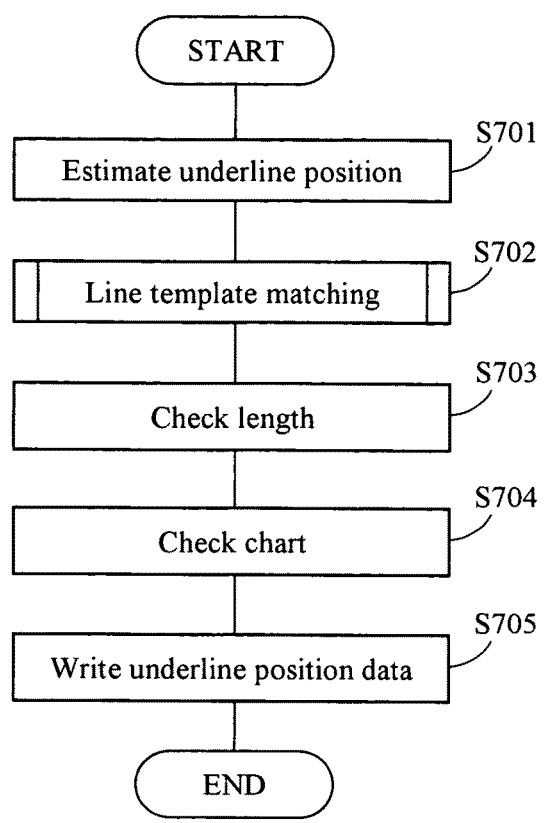
FIG. 7 is a flow chart for explaining an underline search processing unit in the underline removal program.

FIG. 7 is flow chart showing a summary of the underline search process. In the underline search process, underlies are searched from the binary image data 21 as shown in FIG. 3, and position coordinates of the underlines are outputted. The entity of operation is the underline search processing unit 43.

Figure 10B:
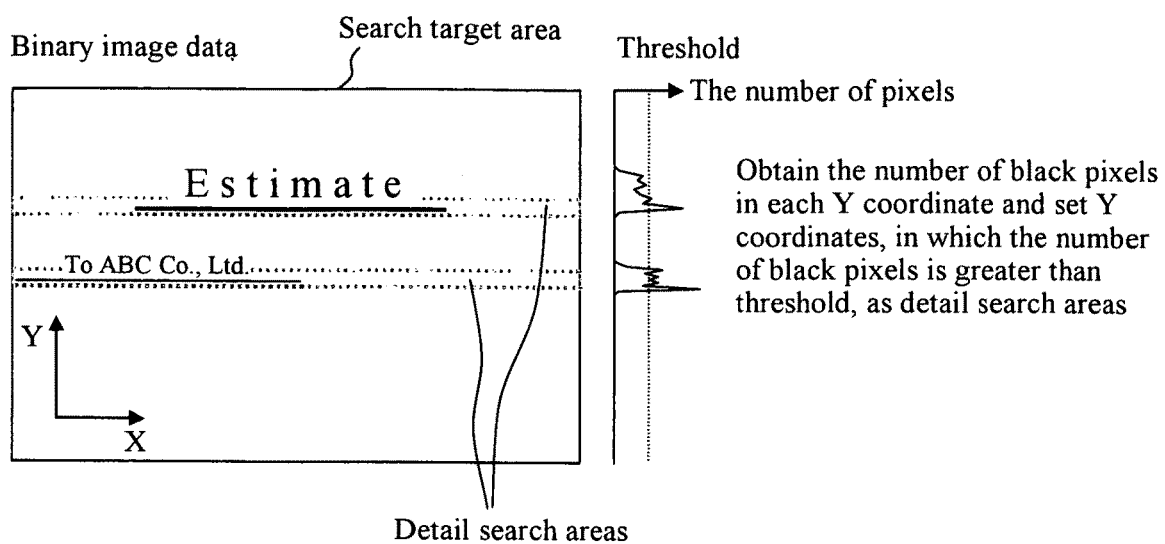
FIG. 10B is an explanatory diagram of an underline estimation process in the underline search processing unit.

In step S701, the binary image data 21 is read out from the data memory 20 to estimate underline positions. FIGS. 10A and 10B are explanatory diagrams of an underline position estimation process.

A search target area is first determined in accordance with the target document. The search target area is an area to be processed in a line template matching process (step S702) described below. The processing speed is improved by narrowing down the processed objects. For example, in a business voucher, underlines are often drawn on important information, such as title, customer name, and order number, and the important information is often written on the upper part of the document. Therefore, the upper part of the document is the search target area in the example shown in FIG. 10A.

The underline positions are then estimated in more details. Specifically, as shown in FIG. 10B, the numbers of black pixels (pixels indicating characters, ruled lines, and underlines) in the Y coordinates in the search target area of the binary image data 21 are calculated, and areas on the Y coordinates, in which the number of pixels is greater than a threshold, are estimated as areas with underlines (detail search areas). In the following process, positions of underlines are searched only in the detail search areas. This can streamline the process.

Figure 8:
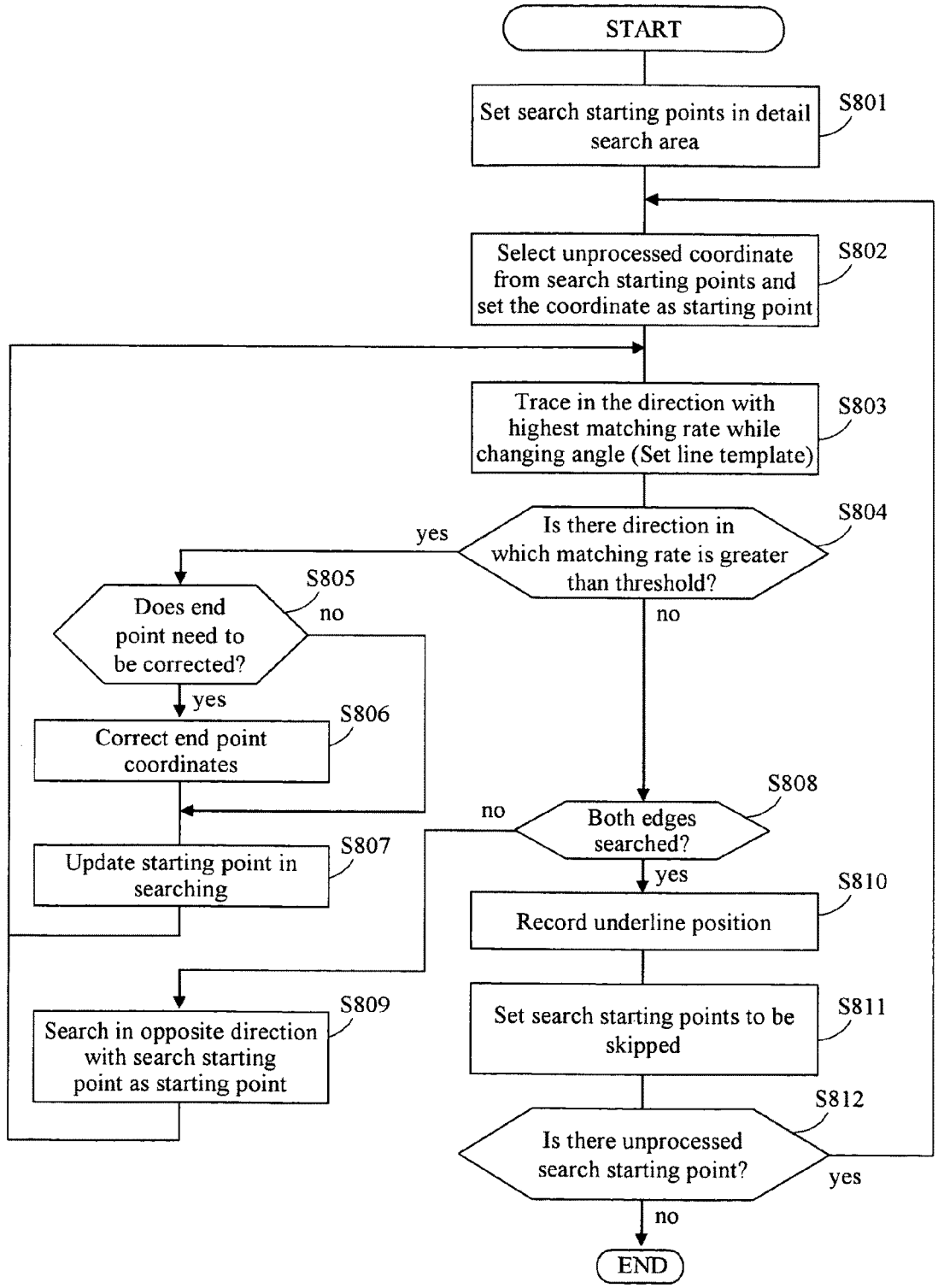
FIG. 8 is a flow chart for explaining a line template matching process in an underline search processing unit.

The line template matching process is executed in step S702. Underline position coordinates of underline areas are extracted from the binary image data. The underline position coordinates are obtained by extracting coordinates, for every predetermined length, included in underline areas with certain width and length, and underline position coordinates determine the framework of the underline areas. Specifically, rectangular line templates having a certain area are set on the binary image data, and pixels satisfying a predetermined value in the line templates are traced. A polyline indicating underline position coordinates is extracted from each line template. As a result, the position coordinates of underlies are identified. Details of the present process will be described later (FIG. 8).

Figure 12A:
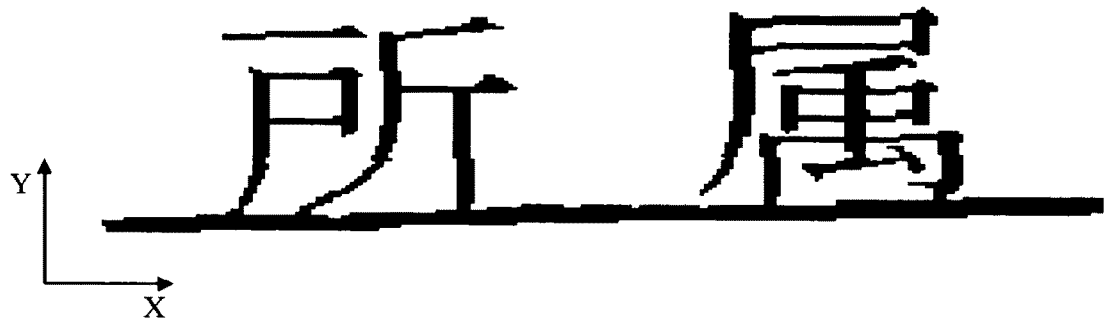
FIG. 12A is an explanatory diagram of a line template matching process in the underline search processing unit.
Figure 12B:
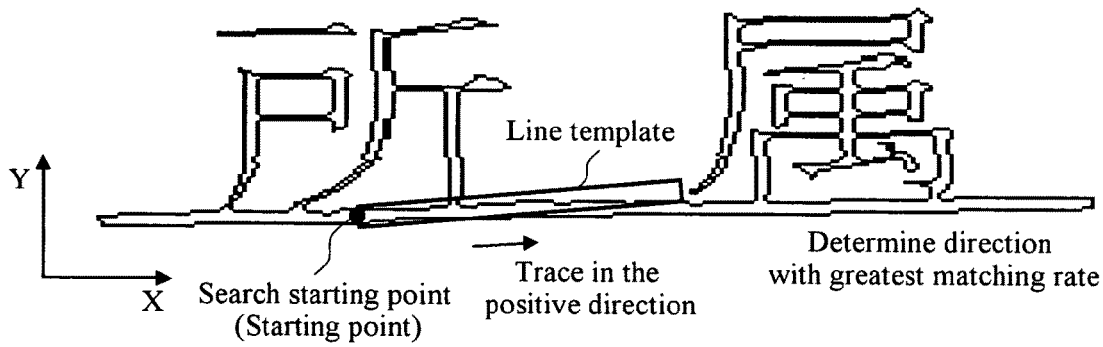
FIG. 12B is an explanatory diagram of a line template matching process in the underline search processing unit.
Figure 12C:
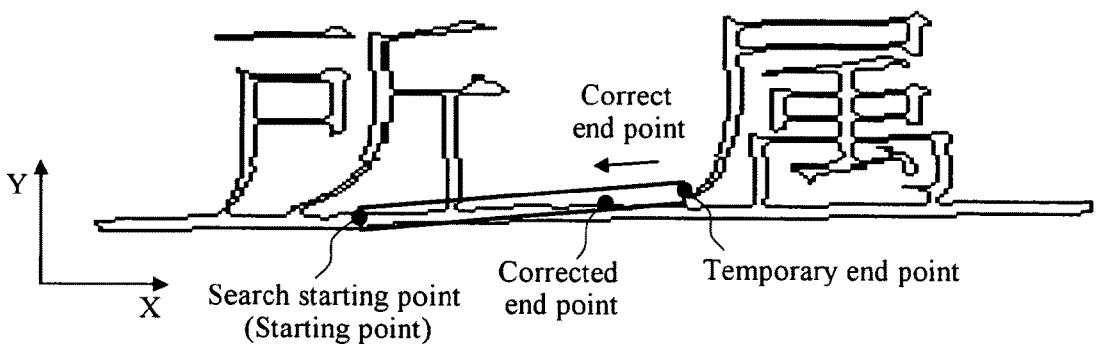
FIG. 12C is an explanatory diagram of a line template matching process in the underline search processing unit.
Figure 12D:
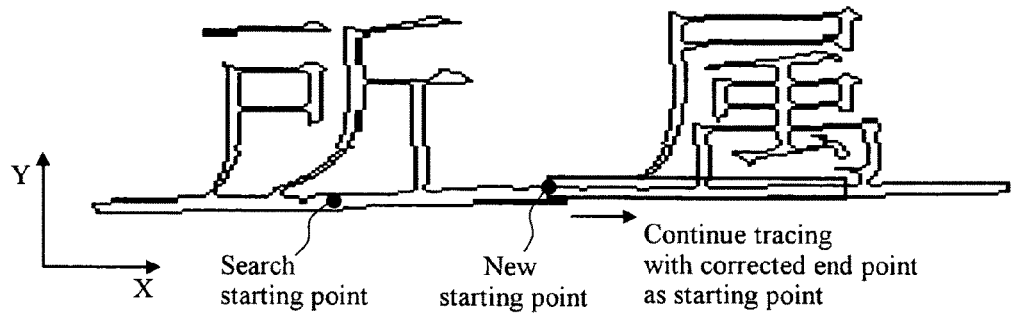
FIG. 12D is an explanatory diagram of a line template matching process in the underline search processing unit.
Figure 12E:
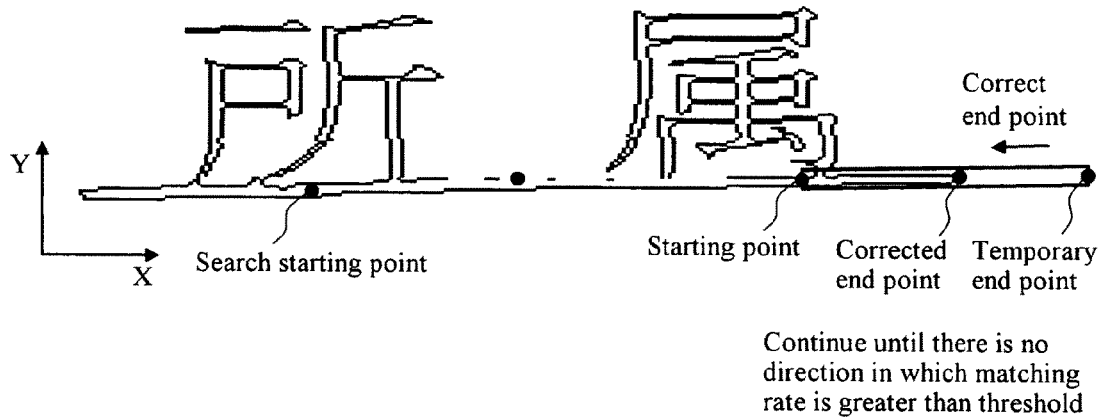
FIG. 12E is an explanatory diagram of a line template matching process in the underline search processing unit.
Figure 12F:
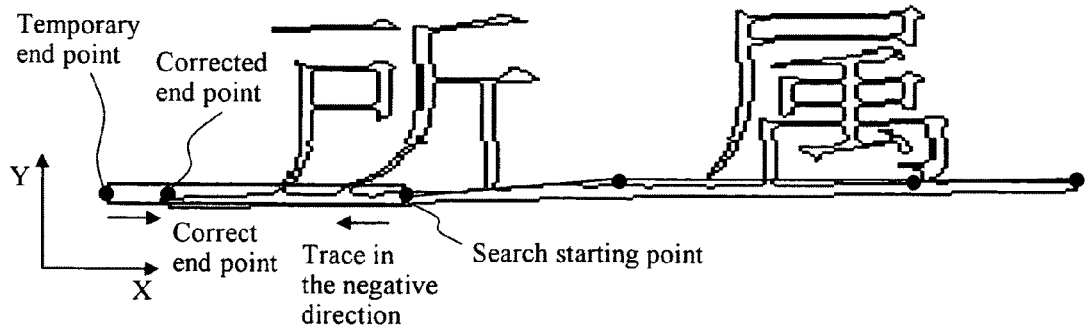
FIG. 12F is an explanatory diagram of a line template matching process in the underline search processing unit.
Figure 12G:
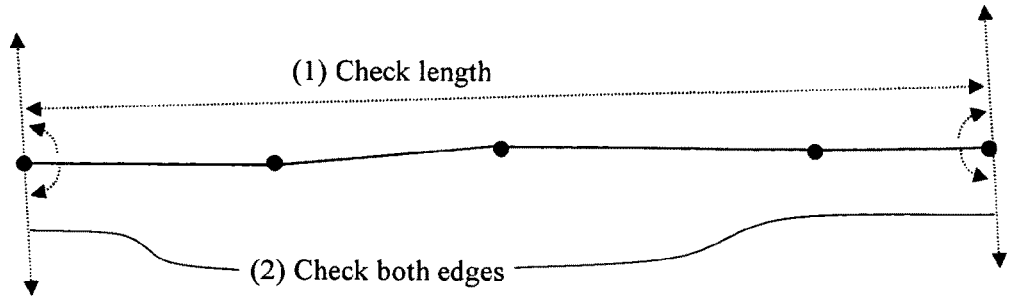
FIG. 12G is an explanatory diagram of a line template matching process in the underline search processing unit.

In step S703, after the completion of the line template matching, the length of the extracted polyline is checked (FIG. 12G). This is for determining whether the extracted polyline is an underline from the viewpoint of length. If the polyline is shorter than a predetermined threshold, the extracted polyline is not an underline, but may be part of characters. In that case, the polyline is deleted from the underline position data.

In step S704, after checking the length, whether the polyline is a ruled line constituting a part of a chart is checked (FIG. 12G). This is for preventing accidental removal of the ruled line of the chart. The chart includes vertical ruled lines constituting the chart at both or one of the edges of the line segments. However, since underlines attached to the characters do not include the vertical lines, this feature is used to distinguish the chart and the underlines. Specifically, pixels in the perpendicular direction relative to the direction of the line segment are checked at both edge points of the polyline. If the polyline is a ruled line constituting a part of the chart, there can be at least one ruled line in the vertical direction at the edge points. Therefore, certain pixels in the perpendicular direction of both edges of the polyline are checked. If there is at least one direction with more than certain black pixels, the polyline is determined as part of the ruled lines constituting the chart, and the polyline is deleted from the underline position data.

In step S705, a polyline remained without being deleted in both the length check process (step S703) and the chart check process (step S704) is recorded in the data memory 20 as final underline position data.

(Line Template Matching Process)

Figure 13:
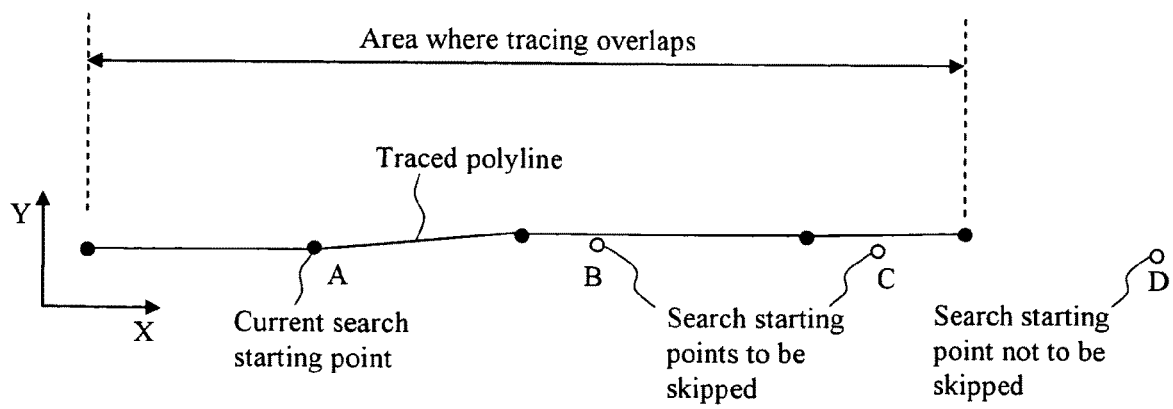
FIG. 13 is an explanatory diagram of a skip process of a search starting point in the underline search processing unit.

The line template matching process for identifying the position coordinates of the underlines executed in step S702 will be described. FIGS. 11 to 13 are explanatory diagrams of the line template matching. FIG. 8 is a flow chart of the line template matching process in the underline search process. Details will be described in accordance with the flow chart.

In step S801, search starting points in the detail search areas determined in step S701 are set. Specifically, as shown in FIG. 11(A), the search target areas are partitioned into grids, and grid points in the detail search areas are set as the search starting points. In the grid points, X coordinate spacing is wide, and Y coordinate spacing is narrow. This is because the underline is drawn in the X-axis direction. The line template matching is performed with the search starting points as starting points.

In step S802, one unprocessed coordinate selected from the search starting points is set as the starting point. Black pixels constituting the underline is traced from the starting point to obtain a polyline (object constituted by continuous line segment) indicating the underline position. The series of processes are applied to every search starting point.

In step S803, a line template is set in a positive or negative direction of the X-axis from the starting point set in step S802. FIG. 11(B) shows the line template. The line template is a rectangular object which is long in the X-axis direction. Black pixels in the line template are then traced.

The line template is set while changing the angle. Specifically, the search starting point is set as the rotation center, and the line template is set so as to face the direction including most black pixels. Changing the angle for tracing allows stable tracing of the underline part even if the document is tilted during scanning.

In the tracing, the matching rate is assumed to be higher when more black pixels are in the line template, and the tracing is performed in the direction with the highest matching rate. In this way, the matching rate is determined in accordance with the number of black pixels in the line template. Therefore, robust searching of underline positions is possible even if there is unevenness in the underlines.

FIG. 12B illustrates a state that the line template matching is applied to a character string with underline of FIG. 12A (shown in black for convenience of description). In FIG. 12B, the line template is set in the positive direction of the X-axis from the search starting point. The angle of the line template is set in an upper right direction, which is the direction with the highest matching rate.

In step S804, whether there is a direction in which the matching rate is greater than a threshold is determined. This is equivalent to determining whether the underline area continues. If there is a direction in which the matching rate is greater than the threshold, the process proceeds to step S805. If there is no direction in which the matching rate is greater than the threshold, the process proceeds to step S808. The threshold is a predetermined constant. As shown in FIG. 12B, when there is an upper right direction in which the matching rate is greater than the threshold, the process proceeds to step S805.

In step S805, if there is a direction in which the matching rate is greater than the threshold in the determination of step S804, in other others, if the underline area continues, whether the end point of the line template needs to be corrected is determined. The case that the end point needs to be corrected is a case that the line template surpasses the underline area and reaches the background area although the underline area continues as shown in FIG. 12C.

In step S806, if a correction is necessary as a result of the determination of step S805, the end point is corrected from the end point of the first line template (temporary end point) to the borderline between the underline area and the background area. The process allows correct extraction of a polyline indicating the underline position. In FIG. 12C, the end point of the line template is corrected from the farthest edge of the line template, which is a temporary end point, to the borderline between the underline area and the background area, which is a corrected end point. On the other hand, if there is no need to correct the position of the end point, the process proceeds to step S807 without changing the position of the end point.

In step S807, the coordinates of the end point are set as a new starting point to update the starting point in searching. The loop from step S803 is executed again, and tracing of the underline continues. The tracing continues until it is determined in step S804 that there is no direction in which the matching rate is greater than the threshold (until the end of the underline). In FIG. 12D, the corrected end point of FIG. 12C is set as a new starting point to reset a line template, and the tracing continues. In FIG. 12E, the tracing continues until the end of the underline area where there is no direction in which the matching rate is greater than the threshold.

In step S808, if it is determined in step S804 that there is no direction in which the matching rate is greater than the threshold, in other words, if the tracing is finished up to the end of the underline area, whether both the tracing in the positive direction and the tracing in the negative direction of the X-axis, with the search starting point set in step S802 as the starting point, are searched is determined.

In step S809, if it is determined in step S808 that only one direction is traced, tracing is performed in the opposite direction from step S803, from the starting point set in step S802. In FIG. 12F, the search starting point is set as the starting point to reset the line template in the negative direction of the X-axis, and the tracing continues in the negative direction.

In step S810, if it is determined in step S808 that both directions are traced, coordinate values constituting the polyline indicating the extracted underlie position are recorded in the underline position data 22.

In step S811, search starting points to be skipped (search starting points that do not have to be traced) are set before setting the search starting point for extracting a new underline. FIG. 13 is an explanatory diagram of the process. As a result of tracing the underline from a current search starting point A, the tracing is completed up to near search starting points B and C. As shown in FIG. 11(A), there are searching starting points in the X-axis direction at certain intervals on the same Y coordinate. Therefore, if tracing of an underline from the search starting point A is finished, there is no need to trace the underline from the search starting points B and C. In such a case, the search starting points having the same Y-coordinate as the current search starting point A and included in a range where the tracing is overlapped are set as the search starting points to be skipped. This can realize efficient and fast processing.

In step S812, if there is an unprocessed search starting point, the process returns to step S802. If there is no unprocessed search starting point, the line template matching process ends.

As a result of tracing the underlines at the search starting points in the detail search areas by the line template matching process, coordinates of the polylines indicating the extracted underline positions are recorded in the data memory 20.

<Underline Removal Process>

Figure 9:
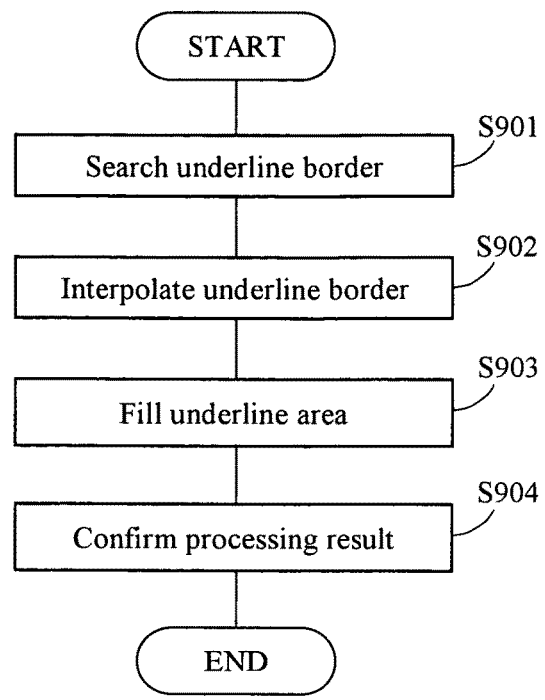
FIG. 9 is a flow chart for explaining an underline removal processing unit in the underline removal program.

FIG. 9 is a flow chart showing a summary of the underline removal process. FIG. 14 is an explanatory diagram of the underline removal process. In the underlie removal process, underlines are removed from binary image data based on the underline position data extracted in the underline search process. The entity of operation is the underline removal processing unit 44. In step S901, as shown in FIG. 14(A), the Y-axis direction is searched from the Y coordinates on the polyline in the underline position data of the binary image data, and the borderline coordinates between the underline (black pixels) and the background (white pixels) are obtained. If more than a certain number of black pixels continue in the Y-axis direction, the area can be a part touching a character, and the Y coordinate of that part is not acquired. The process is applied for all X coordinates on the polyline to acquire the borderline coordinates.

In step S902, a process of interpolating the borderline coordinates between the underline and the character is executed at the contact part between the underline and the character. Specifically, a weighted average of the coordinates at both edge points of the contact part is calculated. FIG. 14(B) is an explanatory diagram of that. Assuming that the edge point on the left side is $P_L(X_L, Y_L)$, the edge point on the right side is $P_R(X_R, Y_R)$, and the interpolation point is $P_M(X_M, Y_M)$, $Y_M$ can be calculated by Expression 1.

$$Y_M = \{(X_R - X_M)Y_L + (X_M - X_L)Y_R\}/(X_R - X_L) \quad (1)$$

The process can appropriately separate the contact part between the character and the underline.

In step S903, as shown in FIG. 14(C), underline borders above and below each polyline are identified based on the borderline coordinates obtained in steps S901 and 902. The area surrounded by the underline borders is filled with white pixels. As a result, the underline is removed from the binary image data.

Figure 15:
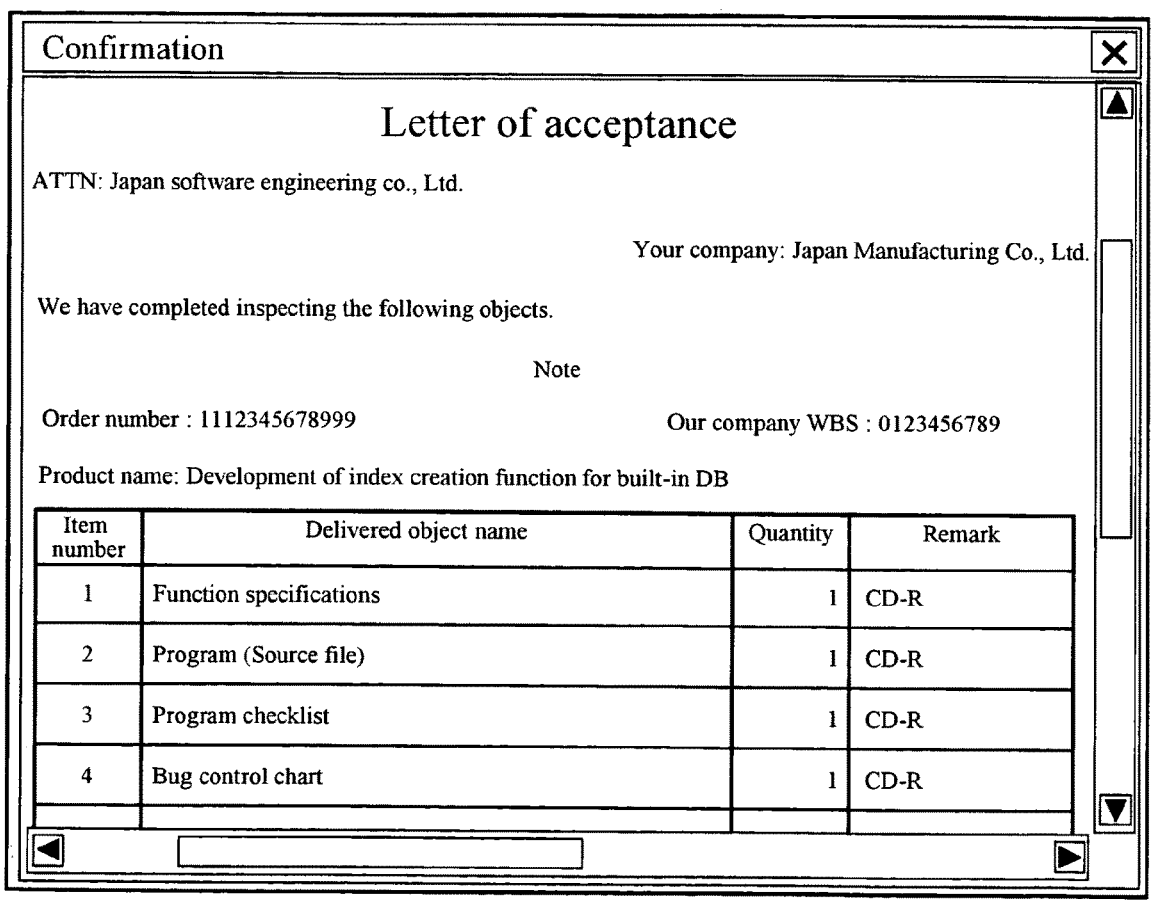
FIG. 15 is a diagram showing an example of a confirmation screen indicating a result of an underline removal process.

In step S904, a confirmation screen as shown in FIG. 15 is displayed. The user can confirm whether the underlines are appropriately removed on the binary image data after the underline removal. If there is no problem, acceptance can be instructed by pressing "Yes" on the confirmation screen. At this point, the binary image data after the underline removal is stored in the storage device 50 as the underline removed image data 52. When the user does not accept, the user can press "No" on the confirmation screen to cancel the process.

<Summary>

The embodiment of the present invention is mainly characterized by the following two processes. One is an underline search process, and the other is an underline removal process.

In the underline search process, underline position coordinates of an underline area are extracted from binary image data. The underline position coordinates are obtained by extracting, for every predetermined length, coordinates included in an underline area with certain width and length. The underline position coordinates determine the framework of the underline area. Specifically, rectangular line templates having a certain area are set on the binary image data, and pixels satisfying a predetermined value in the line templates are traced to extract the underline position coordinate from each line template. A polyline connecting the underline position coordinates extracted in the present process serves as the framework of the underline area.

The present process may be applied by narrowing down in advance to a detail search area, in which the underline area is estimated from the binary image data, to streamline the process. Whether the extracted polyline is a part of a character or a chart may also be checked.

In the underline removal process, borderline coordinates between an underline area and the background and between the underline area and a character string are obtained to remove the identified underline area. Specifically, pixels are searched in the perpendicular direction relative to the polyline along the polyline to obtain the borderline coordinates. More specifically, when pixels satisfying a predetermined number of pixels do not exist in a predetermined range, it is determined as a borderline between the underline area and the background, and the borderline coordinates are obtained. On the other hand, when pixels satisfying the predetermined number of pixels exist beyond a predetermined range, it is determined that the character string touches the underline area, and the borderline coordinates are interpolated. An underline area specified by the obtained borderline coordinates is removed from the binary image data. Specifically, the underline area surrounded by the obtained borderline coordinates is replaced by background pixels.

The processes can remove underline areas from binary image data including underline areas touching character strings. The underline areas can be removed even if a document is tilted during scanning or the underlines are uneven. Furthermore, the underline areas can be distinguished from part of characters and from ruled lines constituting a chart, and the underline areas can be automatically removed.

As a result, characters can be recognized with high accuracy when character recognition is applied by OCR to image data after the removal of underlines.

The present invention can also be realized by a program code of software for realizing the functions of the embodiment. In that case, a storage medium recording the program code is provided to a system or an apparatus, and a computer (or CPU or MPU) of the system or the apparatus reads out the program code stored in the storage medium. In that case, the program code read out from the storage medium realizes the functions of the embodiment, and the program code and the storage medium storing the program code constitute the present invention. Examples of the storage medium for supplying such a program code include a flexible disk, a CD-ROM, a DVD-ROM, a hard disk, an optical disk, a magneto-optical disk, a CD-R, a magnetic tape, a non-volatile memory card, and a ROM.

An OS (operating system), etc., operating on a computer may execute part or all of the actual processes based on an instruction of the program code, and the processes may realize the functions of the embodiment. Furthermore, after the program code read out from a storage medium is written into a memory on a computer, a CPU of the computer, etc., may execute part or all of the actual processes based on an instruction of the program code, and the processes may realize the functions of the embodiment.

Furthermore, a program code of software for realizing the functions of the embodiment may be distributed through a network and stored in a storage section of a hard disk, a memory, etc., of a system or an apparatus or in a storage medium such as a CD-RW and a CD-R. To use the program code, a computer (or CPU or MPU) of the system or the apparatus may read out and execute the program code stored in the storage section or the storage medium.

What is claimed is:

1. An underline removal apparatus that removes an underline area from binary image data including the underline area touching a character string, the underline removal apparatus comprising:

an underline search processing unit that executes a line template matching process by setting a point on the binary image data as a starting point to set a rectangular line template, tracing pixels included in the line template, and extracting a polyline indicating underline position coordinates, wherein the underline search processing unit repeats the line template matching process by setting a point on the binary image data corresponding to the end point as a new starting point to set the left edge of the rectangular line template and setting as a new end point the right edge of the rectangular line template, the underline search processing unit detects that the rectangular line template overlaps a pixel of the background area and corrects the end point of the rectangular line template based on a result of the detection processing to generate a corrected end point, and the underline search processing unit uses the corrected end point as the new starting point in repeating the line template matching process; and an underline removal processing unit that uses the polyline to execute a process of obtaining background borderline coordinates between the underline area and a background area and character borderline coordinates between the underline area and the character string obtained by applying an interpolation process to a part in the underline area touching the character string and to execute a process of removing an area surrounded by the background borderline coordinates and the character borderline coordinates from the binary image data.

2. The underline removal apparatus according to claim 1, wherein the underline search processing unit traces pixels satisfying a predetermined number of pixels among the pixels in the line template.

3. The underline removal apparatus according to claim 1, wherein the underline search processing unit further traces pixels in the perpendicular direction from the polyline, and when there are more than a predetermined range of pixels satisfying a predetermined number of pixels, executes a process of determining that the polyline is a ruled line constituting a chart.

4. The underline removal apparatus according to claim 1, wherein the underline removal processing unit further traces pixels in the perpendicular direction from the polyline, and when there are more than a predetermined range of pixels satisfying a predetermined number of pixels, executes a process of determining that the character string touches the underline area.

5. The underline removal apparatus according to claim 1, wherein the underline removal processing unit executes a process of removing the underline area by replacing an area surrounded by the background borderline coordinates and the character borderline coordinates by a color of pixels of the background area.

6. A non-transitory computer readable storage medium comprising instructions that when executed perform a method for removing an underline area from binary image data including the underline area touching a character string, the method comprising:

a. executing a line template matching process by:
  i. setting a point on the binary image data as a starting point to set a left edge of a rectangular line template,
  ii. setting as an end point a right edge of the rectangular line template,
  iii. tracing pixels included in the line template,
  iv. extracting a polyline indicating underline position coordinates,
  v. detecting a portion of the rectangular line template which overlaps a pixel of the background area,
  vi. generating a corrected end point of the rectangular line template based on a result of the detecting a portion of the rectangular line template, and
  vii. using the corrected end point as the new starting point in repeating the line template matching process;

b. obtaining background borderline coordinates between the underline area and a background area and character borderline coordinates between the underline area and the character string obtained by applying an interpolation process to a part in the underline area touching the character sting from the polyline; and c. removing an area surrounded by the background borderline coordinates and the character borderline coordinates from the binary image data.

* * * * *